United States Patent [19]

Judge

[11] Patent Number: 5,730,279
[45] Date of Patent: Mar. 24, 1998

[54] CONVEYOR HAVING A CARRIAGE

[76] Inventor: Michael C. Judge, 3300 Bee Caves Rd., Suite 650-231, Austin, Tex. 78746

[21] Appl. No.: 492,641

[22] Filed: Jun. 20, 1995

[51] Int. Cl.$^6$ ................................................ B65G 25/00
[52] U.S. Cl. ........................ 198/621.1; 198/630; 198/624
[58] Field of Search .............................. 198/620, 621.1, 198/624, 630, 465.3, 803.2, 604

[56] References Cited

U.S. PATENT DOCUMENTS

| | | | |
|---|---|---|---|
| 1,795,450 | 1/1931 | Sells . | |
| 2,840,090 | 6/1958 | Bradford | 134/151 |
| 3,711,160 | 1/1973 | Mennekes et al. | 299/43 |
| 3,841,461 | 10/1974 | Henderson et al. | 198/30 |
| 4,383,795 | 5/1983 | Wakamatsu | 414/753 |
| 4,449,626 | 5/1984 | Dodd | 198/765 |
| 4,474,295 | 10/1984 | Braschos | 198/370.07 X |
| 4,765,273 | 8/1988 | Anderle | 198/722 X |
| 5,027,714 | 7/1991 | England | 104/162 |
| 5,167,315 | 12/1992 | Doane | 198/890 |

FOREIGN PATENT DOCUMENTS

| | | | |
|---|---|---|---|
| 0196416 | 8/1988 | Japan | 198/630 |
| 1391433 | 4/1975 | United Kingdom | 198/630 |

*Primary Examiner*—James R. Bidwell
*Attorney, Agent, or Firm*—Page Lohr Associates

[57] ABSTRACT

A conveyor with a carriage activates actuators which encourage the carriage along a path. The position of the carriage is detected and used to activate mechanical stimuli to advance the carriage position. Only the portions of the device which are directly advancing the carriage are consuming energy thereby providing an efficient conveyor. Various geometries are suggested such that the conveyor function is independent of carriage path. Various forms of mechanical actuators can be utilized to achieve the same results. The devices have function independent of any particular actuator.

7 Claims, 8 Drawing Sheets

CONVEYOR HAVING A CARRIAGE

BACKGROUND OF THE INVENTION

The invention is generally concerned with conveyors and specifically concerned with conveyors having a carriage of particular shape and arrangement to facilitate motion of the carriage along a predetermined path, the carriage being operable for carrying objects to be conveyed.

In U.S. Pat. No. 1,795,450 by inventor O. S. Sells, a conveying apparatus is described in which actuators, driven by a mechanical cam to promote oscillation, advance objects having a circular cross section; see FIG. 4. The geometry of the actuators in relation to the geometry of the objects to be moved tend to communicate with the particular moving objectives at hand. Regular and predictable movement of objects is realized by proper timing of actuator movement. This is nicely illustrated in the referenced figure. U.S. Pat. No. 2,840,090 also teaches a conveyor, a wave motion conveyor, which employs oscillation elements to advance the position of, for example, fruit. FIG. 5 suggests a motion pattern which forms the "wave". The "wave length" can be adjusted in accordance with physical properties of objects being moved and speeds of desired movement. A more recent patent by inventors Henderson et al., U.S. Pat. No. 3,841,461 similarly shows a wave motion conveyor where the geometry of the objects being moved interacts with the geometry of the actuators. In addition, a clever means for timing parallel operation of similar conveyors arranged side-by-side is taught. See FIG. 1 of the disclosure. From FIG. 4 it is noted that the actuator drive means is a mechanical rotating cam which is suitably driven by a motor. Finally, inventor England teaches in U.S. Pat. No. 5,027,714, a device for conveying automobiles. FIGS. 2 and 3 show a complicated arrangement of actuators which are necessary to couple the particular object (an automobile) to the moving mechanism.

It is sure that these devices and each of them have been arranged with great attention to the: geometries of the objects to be moved; the geometries of the actuators; the moving patterns of the actuators; the timing of the actuators; the stimulation means of the actuators; among other things, in order to affect a desirable conveyor movement property or properties. However, these systems may suffer from certain disadvantages which can be overcome by application of novel arrangements and mechanisms which specifically address these disadvantages.

A first problem relates to actuators which move at times when it is undesirable for them to move. For example, actuators which are driven by a continuously turning cam, like that of U.S. Pat. No. 2,840,090 mentioned above, move regardless if there are objects in the presence of the actuators or not. This necessarily results in wasted energy to remedy this, it may be desirable for actuators to be responsive to the position of objects on the conveyor.

A second problem arises from the fact that objects of various sizes and shapes such as fruit need to be conveyed. In this case, it becomes difficult to fashion actuators which work effectively with each object to be moved. To address this problem, one may consider object carriers having uniform geometries compatible with the conveyor actuators.

Other disadvantages will become obvious when considering the details of the prior art. While the systems and inventions of the prior art are designed to achieve particular goals and objectives, some of those being no less than remarkable, these inventions have limitations which prevent their use in new ways now possible. Prior inventions are not used and cannot be used to realize the advantages and objectives of the present invention.

SUMMARY OF THE INVENTION

Comes now, Michael C. Judge with an invention of a conveyor including devices and methods of moving objects within a carriage along a predetermined path. It is a primary function of this apparatus to provide a conveyor having a carriage with geometries which communicate well with conveyor actuators to achieve certain desired functions. The instant invention stands in contrast to prior methods and devices which do not respond to the position of objects being conveyed. A fundamental difference between conveyor actuators of this invention and those of the art can be found when considering their limited interaction with objects being conveyed.

The invention includes devices which move objects placed in a carriage along a path by applying a force to that carriage by way of a series of actuators. Actuators are arranged to apply a "pinching" action to a carriage. Pinching action tends to push the carriage along a path of arbitrary shape. Force from the pinching action is translated into a force along a direction substantially perpendicular to the pinching action, a direction along the desired path. The geometry of the carriage is arranged to promote this scheme. In particular, an incline or sloping shape at the back of the carriage periphery acts as a force direction translation means. Forces applied to the incline in the direction of actuator movement are translated by the incline to a perpendicular direction, the path direction, and act on the carriage to encourage it along that path. Although pinching can be realized by two actuators moving in opposing directions, pinching may also occur between a single actuator and a rigid member.

A carriage may have wheels between its bottom and a floor in order to promote passage thereover. The wheels may be attached to either the carriage bottom or the floor of the apparatus in various possible versions of the invention. Alternatively, the path may include a track onto which the carriage may be coupled. Combinations of tracks, wheels or rollers may also be possible.

Actuators are mechanical devices which may be employed to apply force to the carriage. Actuators may engage an incline of the carriage by way of some mechanical stimulus such as an electromagnetic solenoid. An actuator generally has a sliding portion and a fixed portion. The sliding portion may be equipped with an end suitable for engaging the carriage periphery. An actuator end may have thereon a friction reduction means such as a wheel or lubrication. In addition to electromagnetic solenoids, alternative actuators may include pneumatically or hydraulically driven types.

An actuator stimulation means may be responsive to the position of the carriage along the path. Only actuators immediately next to a carriage would be activated thus relieving the balance of the actuators in the apparatus from duty when carriages are not present at those corresponding positions. Some switching arrangements are described to accomplish this operation. One example is a carriage being equipped with electrical conductor contacts similar to motor brushes or watch springs. The carriage excites the actuators as it become proximate thereto.

Carriage movement along the path can be in either of two directions. By changing the orientation of the inclined portion of the carriage, the direction of advancement along the path may be changed. The device may also be arranged to accommodate a plurality of carriages at a single time. It is a requirement that a plurality of carriages must move along a path in the same direction if they are being moved at the same time. In view of the motivation and design summarized above, certain objects and advantages of the invention become clear.

It is a primary object of the invention to provide a conveyor having a carriage.

It is an object of the invention to provide a means of moving objects.

It is an object of the invention to provide an apparatus having a carriage which moves along a path.

It is an object of the invention to provide an apparatus having a carriage which moves along a path by way of a force applied by an actuating means.

It is an object of the invention to provide a conveying apparatus with actuators which are responsive to the position of a carriage.

It is an object of the invention to provide a conveying apparatus in which the actuators are activated either electromagnetically, pneumatically or hydraulically.

It is an object of the invention to provide a conveying apparatus which is bidirectional.

It is an object of the invention to provide a conveying apparatus which accommodates a plurality of carriages.

The invention thus stands in contrast to methods and devices known previously.

A better understanding can be had with reference to the detailed description of Preferred Embodiments of the Invention and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions are possible.

BRIEF DESCRIPTION OF THE DRAWINGS

Certain features, aspects, and advantages of the present invention will become better understood with regard to the following description, appended claims and drawings where:

PREFERRED EMBODIMENTS OF THE INVENTION

Figure 1:
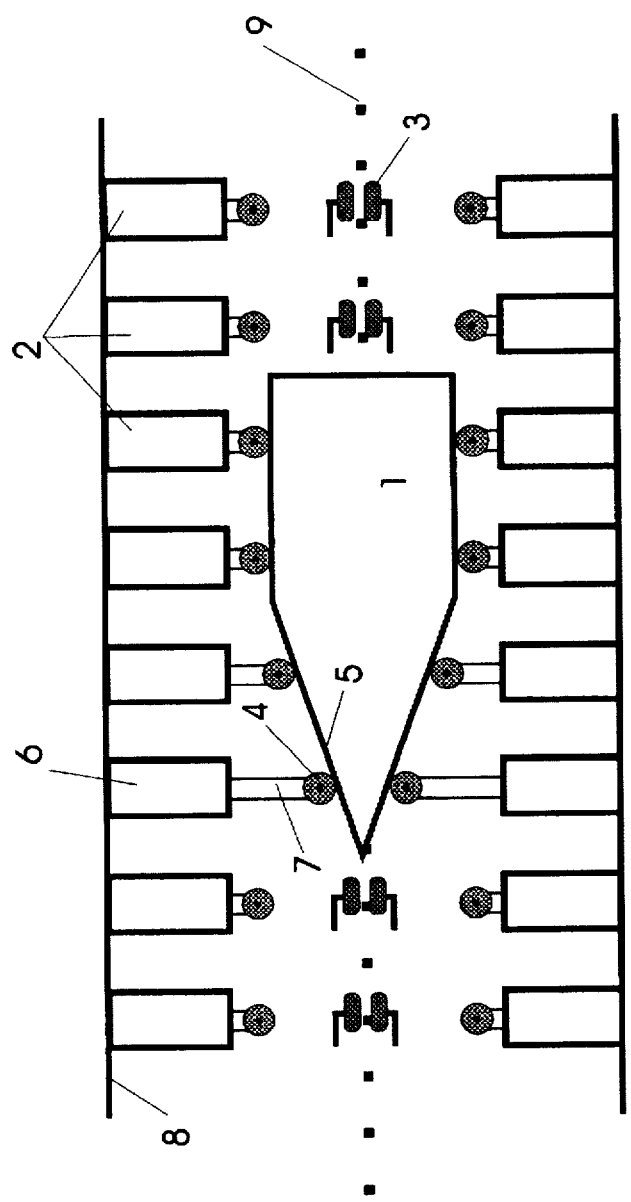
FIG. 1 is a top view of a first version of the invention.

In accordance with each of the preferred embodiments of the invention, there is provided a conveying apparatus having a carriage. With reference to the drawing figures some preferred versions of the invention are illustrated including the best mode known. FIG. 1 shows a portion of an apparatus including a dotted line which indicates a linear path 9 along which are placed a plurality of roller units 3. One can appreciate that the figure shows only a portion of the apparatus, the extension thereof being repetitive. The roller units being mounted to the "floor" of the conveyor may be simple wheels pivotably secured thereto via a rigid mounting means. On either side of the path, along a line 8 parallel thereto, there is an arrangement of actuator devices 2. An actuator may be comprised of a fixed portion 6, a moving portion or plunger portion 7, and a low friction end or wheel 4. A carriage I positioned symmetrically about the path has a back portion with an inclined periphery 5. Actuators engage the carriage at the inclined periphery and exerts a force thereupon. The plunger portion 7 of the actuator slidably moves within a stationary portion 6 in response to some stimulation means. Forces from the actuators applied to the carriage incline portion tend to advance the carriage along the path. Only actuators which are in contact with the inclined portion are to be activated. For example, the actuators indicated by 2 are not yet exerting any force and are left neutral until a time when the carriage advances along the path and causes the wheel portion of an actuator to engage the incline portion of the carriage periphery. When the end of the actuator is engaged with that portion of the carriage, the actuator stimulus is excited and causes the plunger portion of the actuator to apply a force to the carriage. Further details regarding this mechanism are presented later, however, it is useful to first point out possible alternative geometries here.

Figure 2:
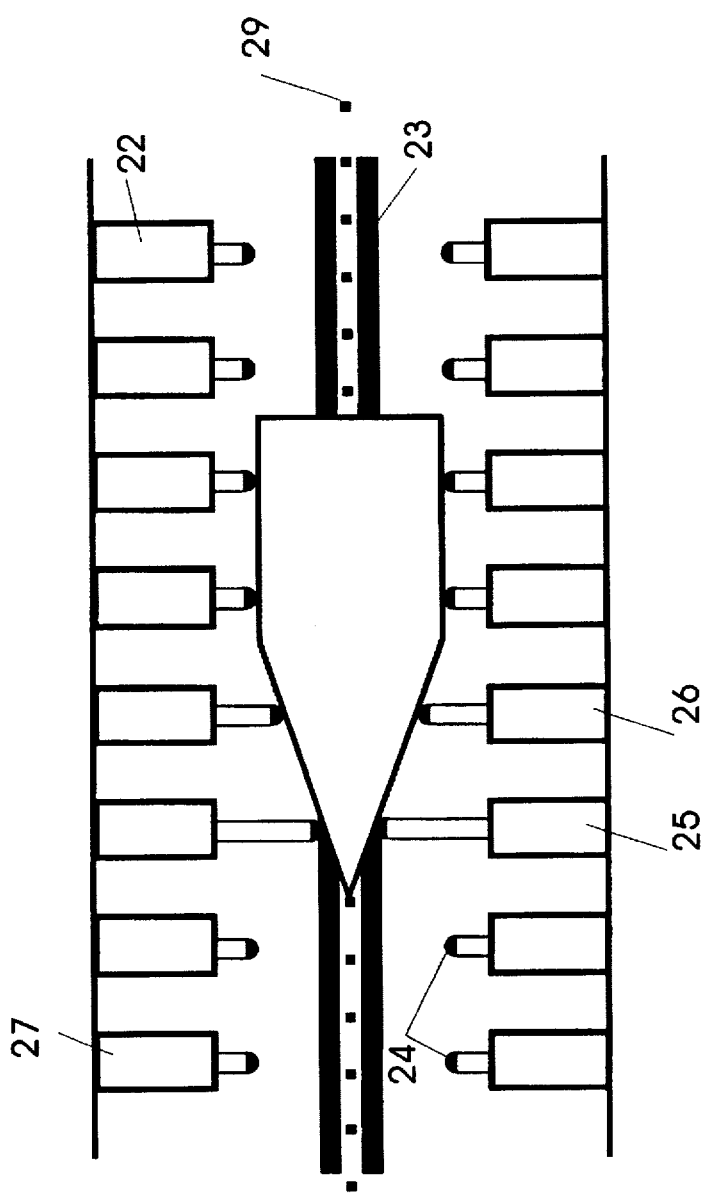
FIG. 2 is a top view of a alternative version of the invention.

In alternative versions shown in FIG. 2, rollers along the path may be replaced by a track 23 which engages the bottom of the carriage in a way which guides the carriage along the path 29. Although the track may be of any various shapes, it is ideally a shape that can facilitate coupling to the bottom of the carriage or some mechanism which can be fixably mounted thereto. If the track has a "T" shaped cross section, then an inverted "U" mounted to the carriage bottom may allow the carriage to ride along the tract. Any of an infinite pairs of complimentary shapes may suffice. Other differences may include the ends 24 of the plunger portion of the actuators. They may be arranged to have various friction reducing mechanisms. A rounded end made of TEFLON may be suitably used to engage the carriage. Although rollers are preferred in some versions, simple static ends or ends employing lubrication may be sufficient in others. The version shown in FIG. 2 is otherwise the same as that shown in FIG. 1.

Figure 3:
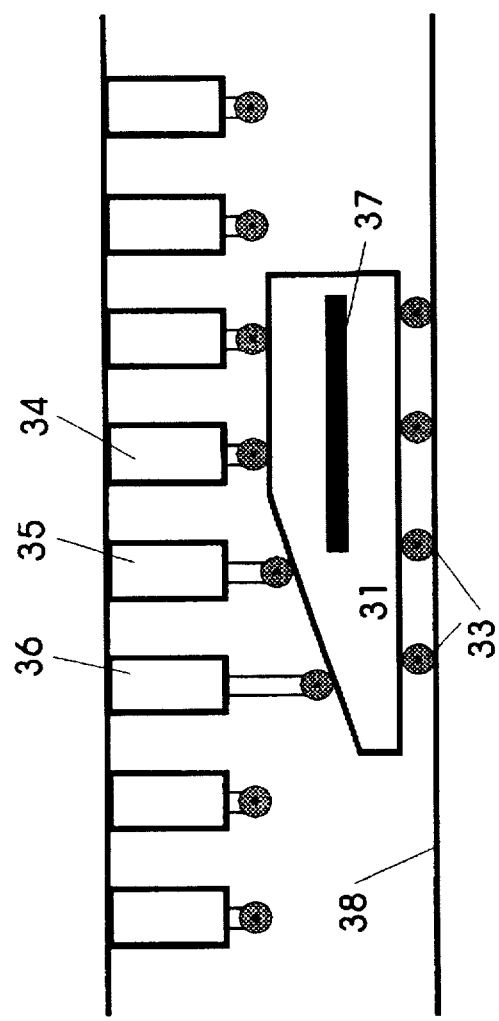
FIG. 3 is a side view of another version of the invention.

It is not necessary that opposing pairs of actuators work together in concert. FIG. 3 shows a side view of a version which illustrates that a carriage having a peripheral geometry as shown can also be used. The rear portion of the carriage periphery has only a single incline surface on the top of the carriage 31. Actuators 35 and 36 can propel the carriage forward as the "pinching" action is realized between the floor 38 of the apparatus and those actuators. Instead of rollers mounted to the floor as in the version of FIG. 1, the carriage may incorporate wheels 33 mounted to the bottom thereof. The wheels could then travel with the carriage and the apparatus would require fewer of them.

The side of the carriage may be equipped with a conductive strip 37. This conductive strip which necessarily moves with the carriage may be used with certain electrical devices to provide switching of the actuators. If a electrical "brush" mechanism or watch spring type sliding contact is affixed to the side of the apparatus, then the conductor can be used to switch the actuators on and off as the carriage passes. A careful observer may note the strip and the incline region are the same length but not aligned to each other. An electrical delay or offset can be employed to assure the actuators engaging the inclined periphery are activated at proper times. For example, actuators 35 and 36 should have energy applied thereto but 34 should still be in a relaxed state. Further details regarding actuator timing are presented after other apparatus geometries are disclosed.

Figure 4:
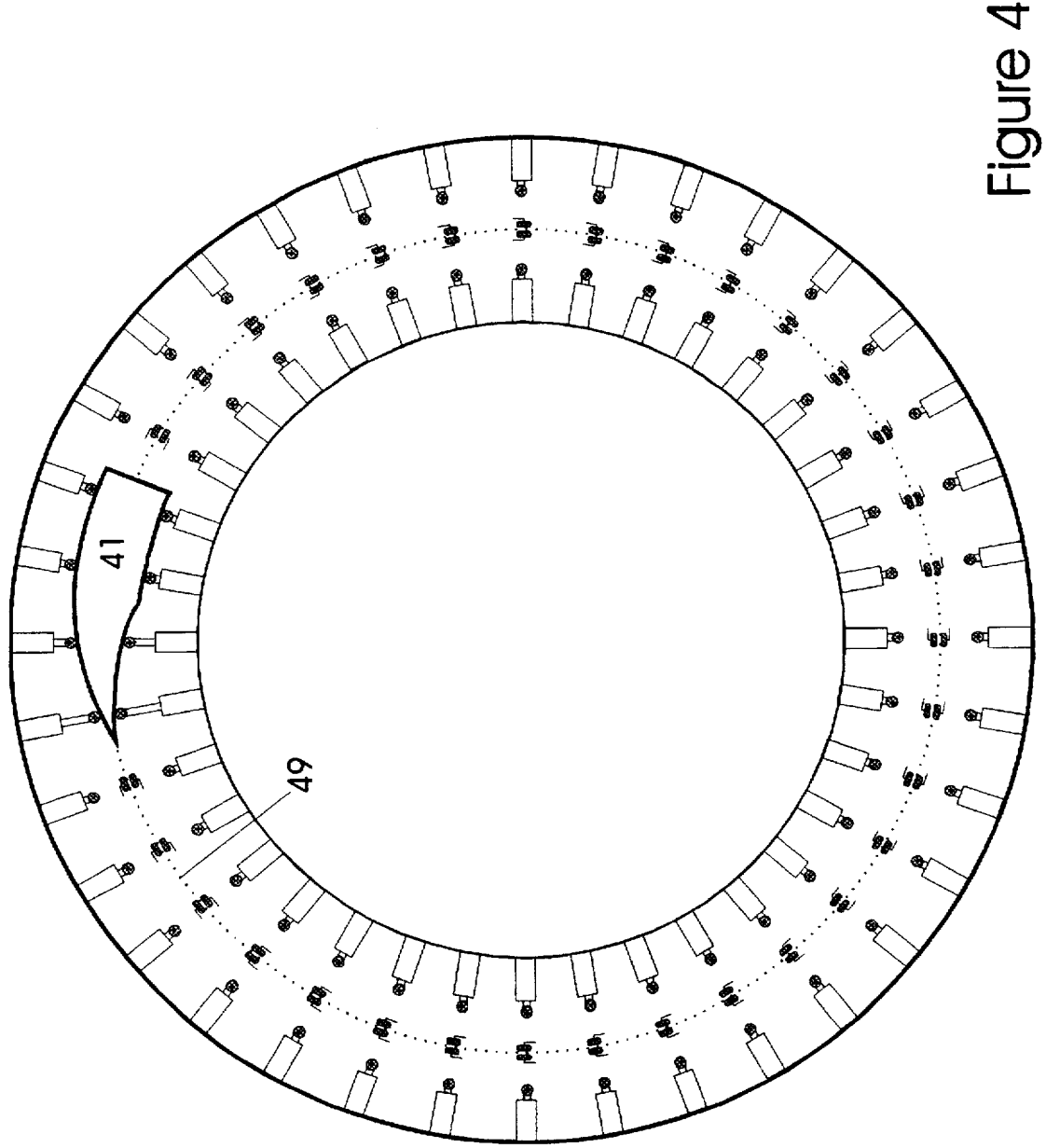
FIG. 4 is an top view of a possible alternative version.

Although the examples of FIGS. 1, 2, and 3 are directed to conveyors having linear paths, it is entirely possible that a path is arcuate or curvilinear in shape. The paths may be point-to-point, open-ended paths or they may be closed-path and continuous. FIG. 4 shows an example of a closed-path conveying apparatus of the invention. Although the path shown is a simple circle 49, other curvilinear paths are possible. A carriage 41 may require that the "incline" region of the carriage be of a special shape to accommodate desired force translation, i.e. a force which encourages the carriage along the path. As the carriage of FIG. 4 advances along the closed path, it will not find an end. The carriage would continue endlessly about the circular path. If sufficiently many actuators are employed, any arbitrary path, linear, simple arcuate, or any other curvilinear path may be realized. In addition, paths may begin at a certain point and end at some other point, an open-ended path; or may be continuous like a circle, a closed-path, as shown in the figure.

Figure 5:
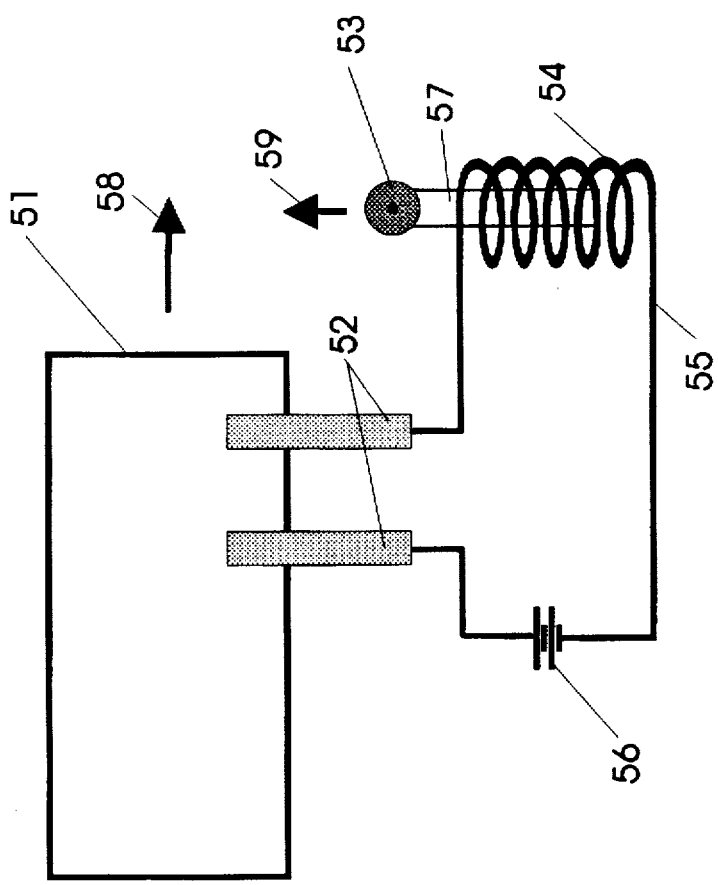
FIG. 5 is an electrical schematic which may be used in some versions.

In the figures, some actuators such as 2, 22, 27 and 34 are shown with their plunger portions withdrawn. Others such as 6, 25, 26, 35 and 36 are shown to be at least partially extended. In order to fully appreciate the invention, a discussion directed to the activation of the actuators is necessary. To save energy, it is desirable to only activate actuators which would engage the incline region of carriage periphery. Other actuators should not be activated or be expending energy. In FIG. 3, a contact which activated select actuators was introduced. Attention is now directed to FIG. 5 where a simple block diagram of an electrical schematic is presented. A conductor 51 may be attached to the carriage at an appropriate position (a conductor such as this is shown as 37 in FIG. 3). Contact brushes 52 which engage the conductor are arranged as an electrical switch in a circuit made up of a power source 56, an electrical conductor 55, a solenoid 54. The conductor 51, being mounted to the carriage, would slidably move in a direction indicated by arrow 58 across the contact brushes. When the conductor 51 is in a position to complete the circuit (as shown) current will flow and cause the moving portion of the actuator, a plunger 57, to move along the solenoid axis in a linear motion along the direction indicated by arrow 59. The wheeled end of the plunger 53 is intended to engage the incline portion of the carriage and exert a force thereon as shown previously as actuator 35 or 36.

Figure 6:
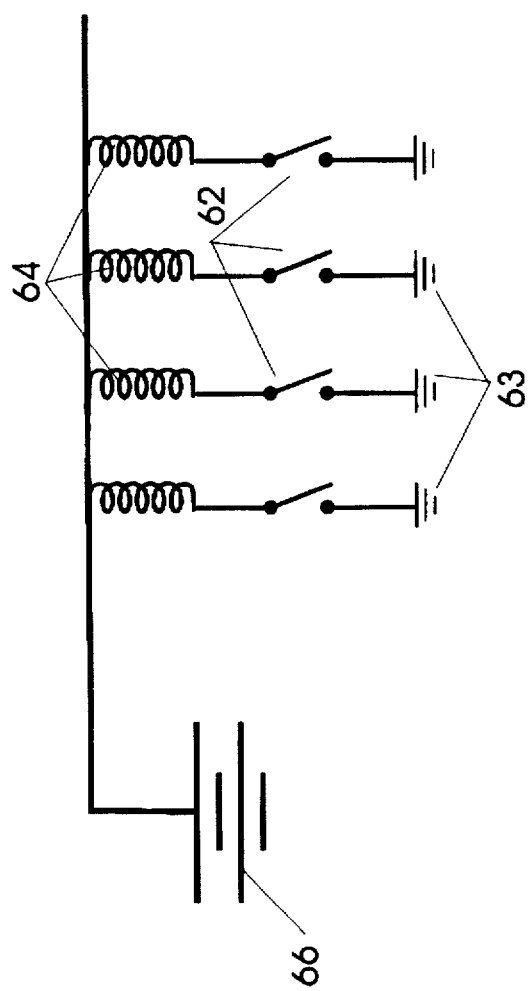
FIG. 6 is a hydraulic schematic which illustrates alternative actuator drive means.
Figure 7:
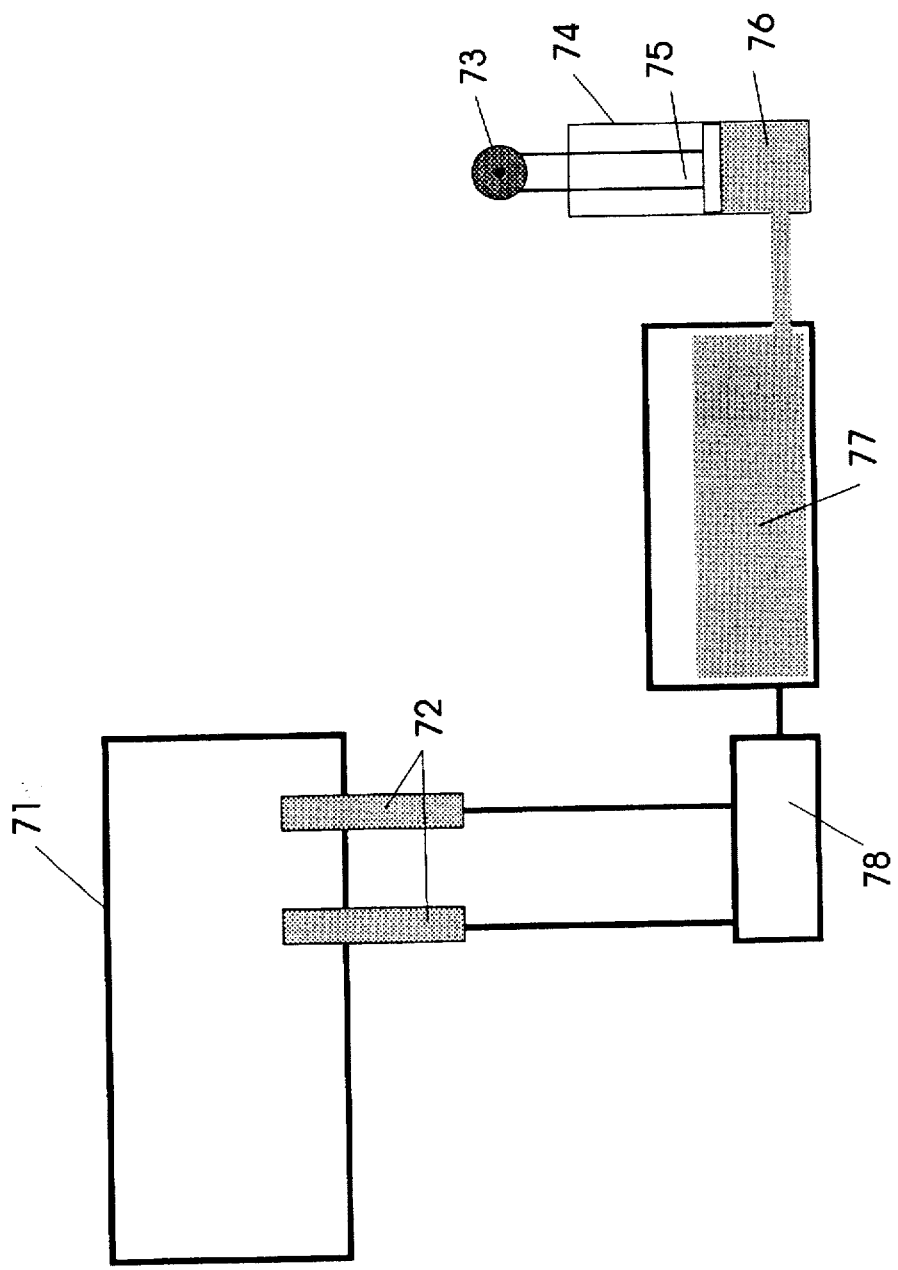
FIG. 7 illustrates a system diagram having a parallel arrangement of circuit elements.

Since the actuators may be electromechanical devices such as a solenoid, we can make an electric circuit for each actuator which is independently responsive to the position of the carriage. FIG. 6 shows a plurality of switches 62 which may be located along a conveyor path. Electrical power from 66 can be arranged in parallel with respect to a common ground 63 where switches 62 are closed as a carriage interacts with them thereby activating, in series, solenoids 64. The scheme is easily extendible to alternative types of actuators as they may also be electrically activated. FIG. 7 shows how a hydraulic system 77, having an electronic controller 78, activated by an electronic brush/contact 72 and 71, may drive an actuator reservoir 76 to move a piston 75 within a cylinder 74 to cause a plunger end 73 to slidably move along a linear path. Similar schemes are available for pneumatic systems.

Figure 8B:
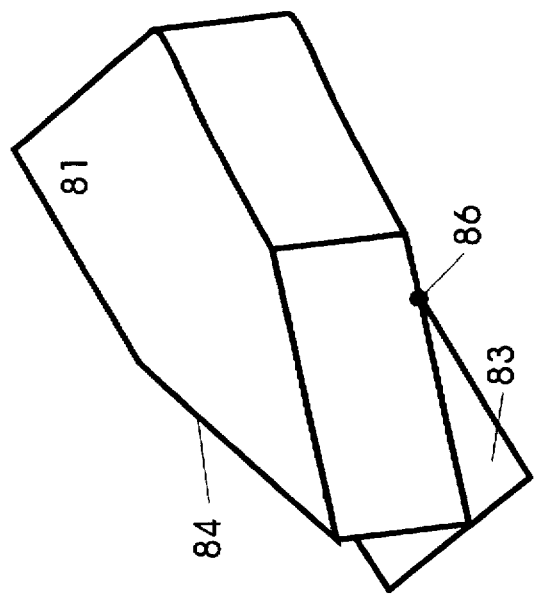
FIGS. 8A and 8B show how a carriage may relate to a stationary track conductor.
Figure 8A:
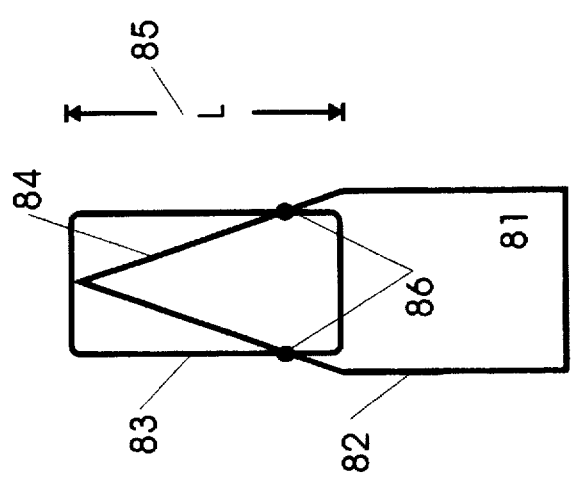

To illustrate a further example of proper timing, FIGS. 8A and 8B have been constructed. A carriage 81 has a front portion periphery 82 and a back portion periphery 84. If the length 85 of a conductor 83 is the same as the length of the incline portion 84, then an electric circuit can be completed for a requisite amount of time. Conductors of the type 83 mounted onto the floor of the apparatus, one conductor for each actuator, may be arranged to come into contact with brush contacts mounted onto the carriage at points 86. FIG. 8B shows a perspective view of the interaction between a carriage and a conductor so mounted. If wheels are used and the carriage is elevated away from the floor, then brush offsets on the bottom of the carriage can effectively result in an embodiment equivalent to the diagram.

Although the shape of the carriage in FIGS. 1 and 2 may be a preferred shape, these shapes are not necessarily the only shapes possible. The aspect ratio of the incline may be adjusted to accommodate particular load characteristics, various arrangements of actuators including numbers of actuators which may engage the incline at any single time, or possibly other desirable configurations allowing complicated paths. It is an important property of the incline region that it is operable for converting a force applied thereto in one direction to a force in another direction. In some cases, we may find a very liberal interpretation of "incline". The carriage of FIG. 4 has a complex rear portion which tends to act on the carriages in a way to encourage it around a curved path.

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

I claim:

1. An apparatus for moving a carriage along a predetermined path, the apparatus being comprised of:
    a) a path having a shape from the group consisting of linear, curvilinear, or arcuate, said path being either a closed-path or an open-ended path;
    b) a carriage having a periphery, the periphery having a front portion and a back portion, the back portion of the periphery including at least one incline portion where the orientation of the inclination is with respect to the direction of said path; and
    c) at least one actuator, linearly movable and arranged to engage and impart a force to said carriage, the actuator being responsive to the position of the carriage along the path.

2. An apparatus of claim 1,
    a) said path further including a plurality of rollers disposed periodically along the path, the rollers having a rotation axis laying in a direction perpendicular to the path and being operable for engaging said carriage so as to freely allow the carriage to move along the path;
    b) said carriage further including: a bottom integrated with the front and back carriage periphery portions, the bottom having an exterior surface operable for being engaged by said rollers in a manner which allows the carriage to move along the path, and a volume partially enclosed by the periphery and bottom operable for containing objects to be moved;
    c) said actuators having a stationary portion and a movable portion, the movable portion being slidably movable in a linear direction in relation to the stationary portion, the actuators being electronically controlled whereby the position of the carriage completes an electric circuit which stimulates movement of the actuators.

3. An apparatus of claim 1, a) said path further including a track, the track having a mechanical coupling means which acts on the carriage whereby the carriage is encouraged to pass along the track in the direction of the path;

b) said carriage further including: a bottom integrated with the front and back carriage periphery portions, the bottom having an exterior surface operable for being engaged by said track in a manner which allows the carriage to move along the path, and a volume partially enclosed by the periphery and bottom operable for containing objects to be moved;

c) said actuators having a stationary portion and a movable portion, the movable portion being slidably movable in a linear direction in relation to the stationary portion, the actuators being electronically controlled whereby the position of the carriage completes an electric circuit which stimulates movement of the actuators.

4. An apparatus of claim 1, a) said path further including a surface, the surface having a mechanical coupling means which acts on the carriage whereby the carriage is encouraged to pass along the track in the direction of the path;

b) said carriage further including: a bottom integrated with the front and back carriage periphery portions, the bottom having rollers operable for being engaged by said surface of said track in a manner which allows the carriage to move along the path, and a volume partially enclosed by the periphery and bottom operable for containing objects to be moved;

c) said actuators having a stationary portion and a movable portion, the movable portion being slidably movable in a linear direction in relation to the stationary portion, the actuators being electronically controlled whereby the position of the carriage completes an electric circuit which stimulates movement of the actuators.

5. An apparatus of claims 2, 3 or 4, said apparatus further comprising:

a plurality of actuators in a parallel arrangement, each actuator having an independent activation switch, the activation switch being closed and opened in accordance with the position of the carriage along the path.

6. An apparatus of claims 2, 3 or 4, said apparatus further comprising:

a plurality of actuators in a parallel arrangement, each actuator having an independent activation switch, the activation switch being closed and opened in accordance with the position of the carriage along the path, and still further comprising:

d) a brush type electrical contact device fixably mounted on the carriage; and e) electrical conductors fixably mounted along the path, the conductors being the same length as the incline portion of the carriage periphery.

7. An apparatus of claims 2, 3 or 4, said apparatus further comprising:

a plurality of actuators in a parallel arrangement, each actuator having an independent activation switch, the activation switch being closed and opened in accordance with the position of the carriage along the path, and still further comprising:

d) a brush type electrical contact device fixably mounted along the path; and e) electrical conductors fixably mounted on the carriage, the conductors being the same length as the incline portion of the carriage periphery.

* * * * *